United States Patent [19]
Fellows et al.

[11] Patent Number: 6,050,691
[45] Date of Patent: Apr. 18, 2000

[54] METHOD OF MAKING RANDOMLY ORIENTED CUBE-CORNER ARTICLES

[75] Inventors: Benjamin T. Fellows, Port Townsend, Wash.; Gerald M. Benson, Woodbury, Minn.; James A. Laird, St. Joseph, Wis.

[73] Assignee: 3M Innovative Properties Company, St. Paul, Minn.

[21] Appl. No.: 09/174,747

[22] Filed: Oct. 19, 1998

[51] Int. Cl.$^7$ .................................................. G02B 5/122
[52] U.S. Cl. .......................... 359/529; 359/530; 359/900
[58] Field of Search ................................ 359/529, 530, 359/546, 900; 264/1.1, 1.9

[56] References Cited

U.S. PATENT DOCUMENTS

| | | |
|---|---|---|
| 3,190,178 | 6/1965 | McKenzie . |
| 3,468,898 | 9/1969 | Altman . |
| 3,712,706 | 1/1973 | Stamm . |
| 3,873,184 | 3/1975 | Heenan . |
| 4,025,159 | 5/1977 | McGrath . |
| 4,202,600 | 5/1980 | Burke et al. . |
| 4,243,618 | 1/1981 | Van Arnam ................................. 264/1 |
| 4,349,598 | 9/1982 | White . |
| 4,588,258 | 5/1986 | Hoopman . |
| 4,775,219 | 10/1988 | Appledorn . |
| 4,895,428 | 1/1990 | Nelson et al. . |
| 4,938,563 | 7/1990 | Nelson et al. . |
| 5,066,098 | 11/1991 | Kult et al. ............................... 359/540 |
| 5,138,488 | 8/1992 | Szczech ................................. 359/529 |
| 5,201,916 | 4/1993 | Berg et al. ............................... 51/293 |
| 5,304,223 | 4/1994 | Pieper et al. ............................. 51/293 |
| 5,304,331 | 4/1994 | Leonard et al. .......................... 264/141 |
| 5,435,816 | 7/1995 | Spurgeon et al. ......................... 51/295 |
| 5,450,235 | 9/1995 | Smith et al. ............................. 359/529 |
| 5,500,273 | 3/1996 | Holmes et al. .......................... 428/147 |
| 5,600,484 | 2/1997 | Benson et al. ........................... 359/529 |
| 5,691,846 | 11/1997 | Benson, Jr. et al. ..................... 359/530 |
| 5,706,132 | 1/1998 | Nestegard et al. ....................... 359/529 |
| 5,786,066 | 7/1998 | Martin et al. ........................... 359/530 |
| 5,805,339 | 9/1998 | Martin et al. ........................... 359/529 |
| 5,840,405 | 11/1998 | Shusta et al. ........................... 359/529 |

FOREIGN PATENT DOCUMENTS

| | | |
|---|---|---|
| 0 844 056 A1 | 5/1998 | European Pat. Off. . |
| 4240680 C2 | 12/1996 | Germany . |
| WO 96/10197 | 4/1996 | WIPO . |
| WO 97/41465 | 11/1997 | WIPO . |

*Primary Examiner*—Cassandra Spyrou
*Assistant Examiner*—Euncha Cherry
*Attorney, Agent, or Firm*—Robert H. Jordan

[57] ABSTRACT

Retroreflective cube-corner articles having randomly oriented cube-corner elements exhibiting rotational symmetry and entrance angularity like microsphere-based sheeting but having increased retroreflective efficiency from cube-corners. The inventive sheeting may contain cube-corner elements typically of different cube-corner geometries, different cube-corner dimensions, and different central axis heights. The cube-corner elements are positioned randomly and are typically not adjacent to one another. Also, methods of making such articles are provided.

16 Claims, 6 Drawing Sheets

METHOD OF MAKING RANDOMLY ORIENTED CUBE-CORNER ARTICLES

TECHNICAL FIELD

The present invention pertains to methods of making cube-corner articles (such as molds and retroreflective sheetings) that exhibit rotational symmetry and entrance angularity by orienting cube-corner elements randomly.

BACKGROUND

Retroreflective articles, typically in sheeting form, have the ability to redirect incident light toward the originating light source. This property has led to their widespread use in a variety of applications relating to traffic and personal safety markings. Retroreflective sheetings are particularly useful to guide motorists under poor lighting conditions, such as, for example, under nighttime driving or under inclement weather. Examples of uses of retroreflective sheeting include, but are not limited to, traffic signs, cones, and barricades. A retroreflective sheeting typically tries to convey information to a motorist. Because of the different types of vehicles on the road, ranging, for example, from semi-trailers to passenger automobiles to motorcycles, it is desirable that the sheeting conveys substantially the same information to motorists operating different types of vehicles.

There are essentially two types of retroreflective sheeting: microsphere-based sheeting and cube-corner based sheeting. Microsphere-based sheeting uses a multitude of independent microspheres, either glass or ceramic, typically at least partially embedded in a binder layer and having associated specular or diffuse reflecting materials (e.g., pigment particles, metal flakes, or metal vapor coats) to retroreflect incident light. Illustrative examples of microsphere-based sheeting are disclosed in U.S. Pat. No. 3,190,178 (McKenzie); U.S. Pat. No. 4,025,159 (McGrath); and U.S. Pat. No. 5,066,098 (Kult).

From an optics perspective, microsphere-based sheeting typically exhibit rotational symmetry and entrance angularity due to the symmetrical geometry of the individual microspheres. Therefore, the retroreflective performance of microsphere based sheeting is typically not sensitive to the orientation at which the sheeting is placed on a substrate. Microsphere-based sheetings, however, tend to exhibit lower brightness when compared to cube-corner based sheetings.

Cube-corner retroreflective sheeting typically uses an array of cube-corner elements to retroreflect light incident on a major surface of the sheeting. The basic cube-corner retroreflective element is generally a tetrahedral structure having a base triangle and three mutually substantially perpendicular optical faces that cooperate to retroreflect incident light. The optical faces intersect at an apex. The base triangle lies opposite the apex. Each cube-corner element also has an optical axis, which is the axis that extends through the cube-corner apex and trisects the internal space of the cube-corner element. In operation, light incident on the base plane is transmitted into the cube-corner element, is reflected from each of the three optical faces, and is redirected toward the light source.

Figure 1:
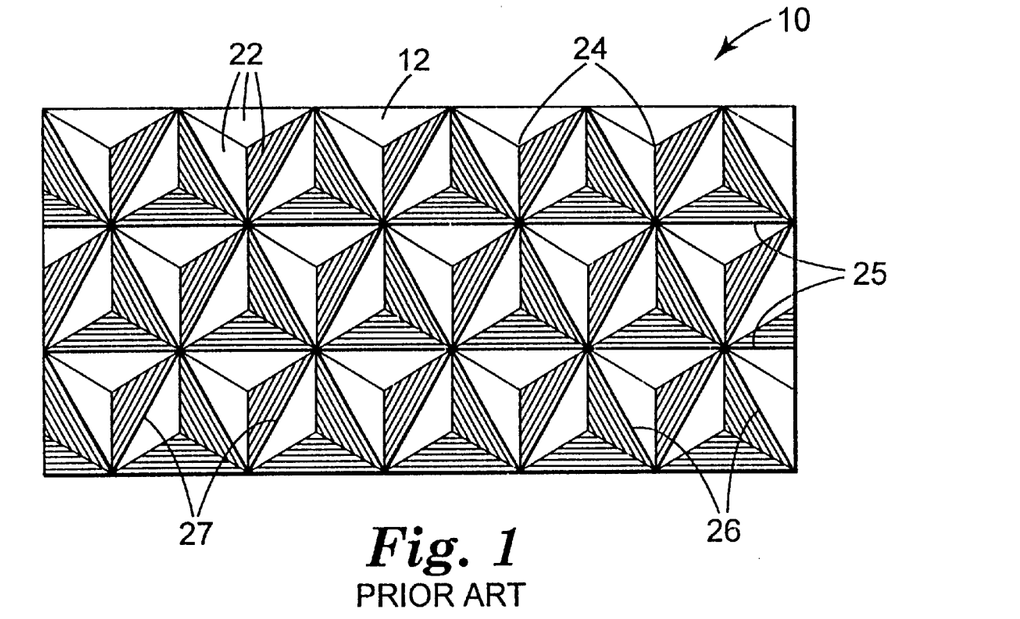
FIG. 1 is a plan view of a non-retroreflective side of a prior art cube-corner retroreflective article.

FIG. 1 shows the non-retroreflective side of a prior art retroreflective sheeting using an array of cube-corner elements. Retroreflective sheeting 10 has cube-corner elements 12, which are in the shape of a tetrahedral prism with three exposed optical faces 22. Cube-corner elements 12 in known arrays are typically defined by three sets of parallel v-shaped grooves 25, 26, and 27. Adjacent optical faces 22 on adjacent cube-corner elements 12 in each groove form an external dihedral angle, the angle formed by two intersecting planes. This external dihedral angle is constant along each groove in the array. Each cube-corner element in the ordered array sits adjacent to another. Although apex 24 of each cube-corner element 12 may be vertically aligned with the center of its base triangle, the apex can also be offset or canted from the center as disclosed in U.S. Pat. No. 4,588,258 (Hoopman). Other illustrative examples of retroreflective sheeting using cube-corners are disclosed in, for example, U.S. Pat. No. 4,349,598 (White); U.S. Pat. No. 4,895,428 (Nelson et al.); and U.S. Pat. No. 4,938,563 (Nelson et al). Compared to microsphere-based sheetings, cube-corner sheetings are more efficient at retroreflecting incident light but can exhibit poor entrance angularity and rotational symmetry. Cube-corner elements, however, can be designed specifically to enhance entrance angularity and rotational symmetry performance.

Cube-corner optics in retroreflective sheeting can be, and often are, designed to give optimal performance at a specific orientation. For example, U.S. Pat. No. 4,588,258 (Hoopman) discloses retroreflective sheeting which uses a design having canted cube-corner elements forming opposing matched pairs. It is also disclosed that the sheeting has a primary plane of improved retroreflective performance at high entrance angles, identified as the x-plane, and a secondary plane of improved retroreflective performance at high entrance angles, identified as the y-plane. In use, it is recommended that such sheeting be oriented so that its principal plane of improved retroreflective performance (i.e., the x-plane) is coincident with an expected entrance plane. Thus, the retroreflective sheeting has a single preferred orientation. Although the retroreflective sheeting is very useful, its single preferred orientation may preclude its use in applications where the preferred orientation is not aligned with an expected entrance plane.

Some skilled in the retroreflective art have tried to reduce the orientation sensitivity of cube-corner sheeting by creating zones of cube-corner elements and tiling the zones in different directions. For example, U.S. Pat. No. 4,202,600 (Burke et al.) discloses a retroreflective sheeting that has a plurality of small zones of cube-corner prisms. The zones are of differing orientation distributed in a pattern across the sheet. The zones are small enough so that at a minimum viewing distance from the sheeting (which may be several hundred feet in the case of a highway sign), the zones cannot be resolved by the unaided human eye. Each zone has triangular cube-corner prisms in an array having hexagonal symmetry. The cube-corner array in one portion of the zone is rotated with respect to the arrays in another portion of the zones in such a way as to reduce the variations in the retroreflective efficiency of the sheet as a whole.

U.S. Pat. No. 5,706,132 (Nestegard et al.) provides a cube-corner sheeting having alternating zones of cube-corner arrays. The alternating zones are oriented such that their primary planes of entrance angularity are approximately perpendicular to one another. In use, the sheeting may be oriented in either of two preferred orientations, rather than a single orientation as is common with many known retroreflective sheetings. Although the sheeting is very useful for applications requiring two preferred orientations perpendicular to one another, such as truck conspicuity, it may not be as useful for applications requiring rotational symmetry, such as for example, retroreflective signs containing indicia.

U.S. Pat. No. 5,786,066 (Martin et al.) describes a method and apparatus for making a retroreflective structure having individual cube-corner prisms. The method includes the steps of forming a release coating on a base material, forming an array of solid light transparent prisms on the release coating, and forming a reflective layer on the prisms. The prisms are formed by casting a plastic oligomer, which is adhered to the release coating. In one embodiment, the prism array is stripped from the base material at the release coating thereby freeing the prisms, which may be dispersed in a paint or transparent binder. This material can be used for printing retroreflective images on fabrics or other substrates.

A need exists for a cube-corner retroreflective article that exhibits rotational symmetry and entrance angularity performance similar to that of microsphere-based articles while taking advantage of the potentially higher retroreflective efficiency of cube-corner retroreflective articles.

SUMMARY

This invention provides cube-corner retroreflective articles exhibiting features of rotational symmetry and entrance angularity like that of microsphere-based articles. Such features are achieved by orienting the cube-corner elements randomly so that typically essentially no two cube-corner elements are directly joined and typically no two adjacent elements are in the same orientation. The inventive articles may have enhanced brightness over microsphere-based articles due to the higher retroreflective efficiency of cube-corner elements as compared to microspheres. This invention also provides methods for making such articles, e.g., sheeting.

In brief summary, a method of making a cube-corner article of the invention comprises the steps of: (a) providing a plurality of discrete cube-corner elements, each element having a base plane, a central axis, and at least three base edges each element bounded by at least three optical faces that cooperate to retroreflect incident light; (b) disposing the cube-corner elements on a substrate; and (c) affixing the cube-corner elements randomly to the substrate such that a substantial portion of the elements' base edges are not parallel to adjacent cube-corner elements and a substantial portion of the elements' base planes are in contact with the substrate.

In one illustrative embodiment, the inventive article comprises a polymeric topfilm having a major surface with a structured surface projecting therefrom, the structured surface defined by a plurality of cube-corner elements having at least three base edges. The base edges of a substantial portion of the cube-corner elements are neither parallel to or in contact with the base edges of adjacent cube-corner elements.

The inventive article exhibits rotational symmetry allowing a user the flexibility of placing it on a substrate at any orientation and be reasonably assured that it will retroreflect incident light with substantially the same intensity. Thus, the user does not have to be concerned with placing the inventive sheeting in a preferred orientation, as now done with some known cube-corner sheetings. Many applications benefit from a cube-corner sheeting exhibiting rotational symmetry. Signing applications are good examples. Because there is no preferred orientation, economic efficiency can be achieved by reducing the amount of labor and waste generated in fabricating a sign. For example, a cube-corner based traffic sign with an arrow indicating that the road curves to the right can be made with the inventive sheeting by simply cutting out the arrow. Such a sign should have uniform brightness so that essentially the entire arrow retroreflects.

DEFINITIONS

As used herein:

"apex" of a cube-corner element is the point of intersection of the elements' faces;

"base edges" of a cube-corner element are generally linear and generally lie in a single plane that defines the base plane; and arise from the intersection of an element's base plane and faces;

"base plane" of a cube-corner element is the plane through which incident light enters so as to be retroreflected by the element's optical faces, and in most cases, is the plane that is attached to a substrate;

"central axis" of a cube-corner element is the axis that intersects the element's apex, is perpendicular to the base plane, and depending upon the shape of the element, it may not trisect the internal space of the cube-corner element;

"cube-corner element" means a body or protrusion projecting from a surface, the body or protrusion bound at least in part by at least three optical faces and may include non-optical faces;

"cube-corner mold" means a structure having a plurality of cube-corner shaped cavities and when used to receive materials, such as, for example, polymers, create cube-corner elements;

"cube-corner shaped cavity" means a hollow area bounded at least in part by at least three optical faces and may include one or more non-optical faces;

"cube-corner tool" means a structure having first and second surfaces, the first surface defined by a plurality of cube-corner elements that may be joined together by a land layer, the second surface is opposite that of the first surface and is typically flat;

"discrete cube-corner elements" means individual cube-corner elements not connected to one another, the elements having a base plane, at least three base edges, a central axis, at least three optical faces, and may include non-optical faces;

"entrance angularity" describes a retroreflective article's brightness performance as a function of the incident light's entrance angle on the article and the orientation of the article;

"faces" of a cube-corner element or a cube-corner shaped cavity are the surfaces, typically planar, that intersect one another;

"land" means a layer immediately adjacent to the base plane of the cube-corner elements;

"non-optical faces" in a cube-corner element or cube-corner shaped cavity are incapable of cooperating with other faces to retroreflect incident light because the faces are non-orthogonal to other faces;

"optical axis" of a cube-corner element is the axis that extends through the apex and trisects the element's internal space;

"optical faces" in a cube-corner element or cube-corner shaped cavity are faces that are substantially mutually perpendicular (i.e., the faces form an internal dihedral angle of about 90°) that cooperate to retroreflect incident light;

"randomly oriented cube-corner elements" means that the elements are typically not immediately adjacent to one another, and that they typically have base edges that are not parallel to the base edges of adjacent cube-corner elements;

"rotational symmetry" means that the article does not have any preferred orientations so that at essentially any entrance angle (for a given distance from the article), it will retroreflect incident light at substantially the same intensity regardless of its orientation on a substrate; and "substantially" means at least fifty percent of the total number, e.g., at least fifty percent of all cube-corner elements.

BRIEF DESCRIPTION OF THE DRAWINGS

The invention will be further explained with reference to the drawings, wherein.

These figures, which are idealized, are not to scale, and are intended to be merely illustrative and non-limiting.

DETAILED DESCRIPTION OF ILLUSTRATIVE EMBODIMENTS

The inventive article contains a first, microstructured surface and a second, substantially planar surface. The first surface is defined by a plurality of cube-corner elements oriented randomly. Suitable materials for use as either first or second surfaces include glass, metals, polymers, and ceramics. The first and second surfaces may be of dissimilar materials. For example, in the case of a mold, the first surface may be metallic and the second surface may be polymeric. Typically, in a cube-corner mold, the first and second surfaces of the inventive cube-corner mold are metallic, for example, iron, copper, or nickel.

Figure 2:
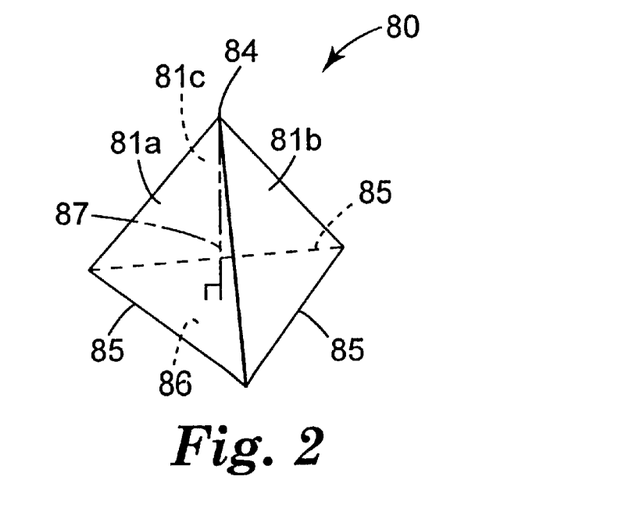
FIG. 2 is an isometric view of a cube-corner element that can be used in the invention.

Cube-corner elements of essentially any geometry, either known in the prior art or those yet to be developed, that are capable of retroreflecting some portion of incident light are useful in the practice of the present invention. FIG. 2 illustrates a cube-corner element 80 useful in retroreflective sheetings produced by methods of the invention or in sheetings of the prior art. As shown, cube-corner element 80 is a body that has three mutually perpendicular optical faces 81a, 81b, and 81c that meet at the element's apex 84. The cube-corner element's base edges 85 are generally linear and generally lie in a single plane that defines the base plane 86. Cube-corner 80 has central axis 87 which extends through apex 84 and is perpendicular to base plane 86. Because the cube-corner elements are intended to be microstructures, the maximum height of central axis 87 typically is about 1500 micrometers (0.059 inch). Cube-corner 80 also has an optical axis (not shown) which trisects the cube-corner element's internal space. The optical axis may be disposed perpendicular to base plane 86, in which case it coincides with the central axis 87, or it may be canted as described in U.S. Pat. No. 4,588,258 (Hoopman) and U.S. Pat. No. 5,138,488 (Szczech).

Another cube-corner element design useful in the practice of the invention has a rectangular base, two rectangular sides, and two triangular sides to form a matched pair of cube-corners elements, as disclosed in U.S. Pat. No. 4,349,598 (White) and U.S. Pat. No. 4,938,563 (Nelson et al). The rectangular and triangular sides function as optical faces. Because each of White's and Nelson's cube-corner element has two apexes, it also has two central axes. It is only necessary to rotate the matched pair about one central axis to randomly orient the elements randomly. Other cube-corner configurations known in the art and useful for the practice of the invention include, for example, U.S. Pat. No. 5,600,484 (Benson et al.); U.S. Pat. No. 4,895,428 (Nelson et al.); U.S. Pat. No. 4,775,219 (Appledorn); U.S. Pat. No. 4,243,618 (Van Arnam); U.S. Pat. No. 4,202,600 (Burke et al.); and U.S. Pat. No. 3,712,706 (Stamm).

In general, known cube-corner elements are formed in ordered arrays and need to be further processed to create discrete elements. It is the discrete elements that are useful for the practice of the present invention in that they can be rotated about a central axis to produce randomly oriented elements. Each discrete cube-corner element generally has polygon base plane, is bounded by at least three optical faces, and may include one or more non-optical faces.

Figure 3:
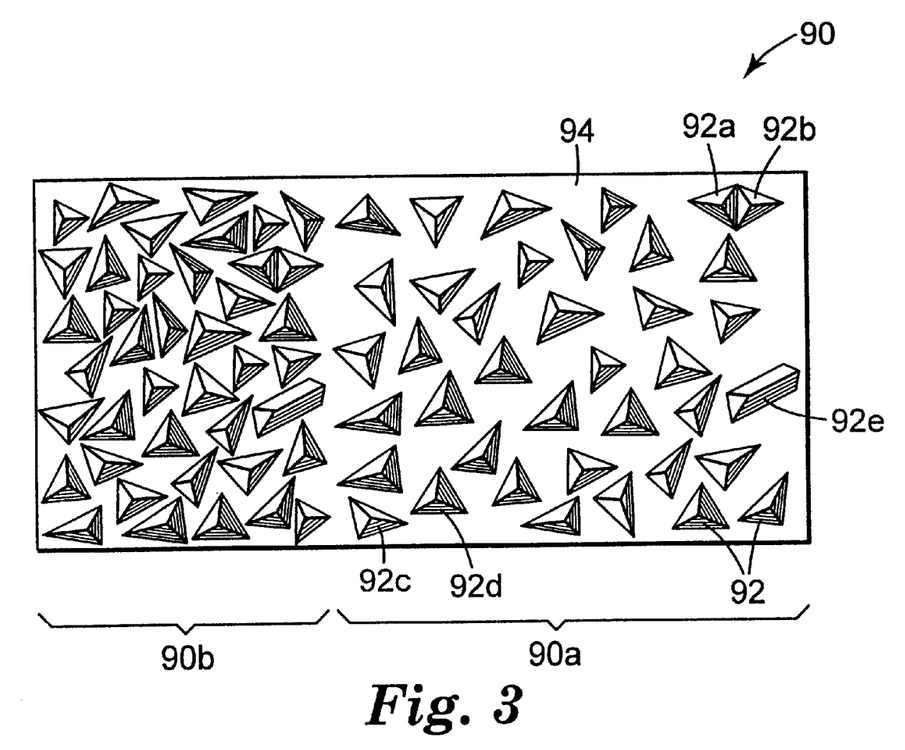
FIG. 3 is a plan view of the non-retroreflective side of an illustrative embodiment of the invention.

FIG. 3 shows a first, microstructured, non-reflective side of an inventive article 90 having cube-corner elements 92 randomly oriented on substrate 94. Cube-corner elements 92 are typically separated from one another, as shown by elements 92c and 92d, but may be connected as depicted by elements 92a and 92b. Cube-corner elements 92 may be of different sizes, different geometries, and different central axis heights, as shown in 92c, 92d, and 92e. The cube-corner elements typically have at least three base edges, although elements with more than three base edges may be used, e.g., 92e. A substantial portion of the cube-corner elements is disposed such that their base edges are not parallel with or adjacent to the base edges of other cube-corner elements, although a limited number of cube-corner elements may be exceptions to this, e.g., 92a and 92b. FIG. 3 also shows the differences in inventive article's packing densities, i.e., the number of cube-corner elements per unit area. Portion 90a has a lower packing density than portion 90b and one skilled in the art would expect portion 90a to have lower retroreflective efficiency than that of 90b.

Furthermore, protuberances with substantially no retroreflective properties can be attached to the first surface. The protuberances would be useful as areas to fuse a sealing film, by a network of narrow intersecting bonds, thereby forming sealed cells having cube-corner elements encapsulated therein. Such cells are disclosed in, for example, U.S. Pat. No. 4,025,159 (McGrath).

Retroreflective articles using cube-corner elements that are randomly placed, such as that shown in FIG. 3, have no preferred orientations and thus would have retroreflective performance independent of their orientation on a substrate. For example, when a strip of the inventive article is placed at any orientation on a unit circle, whether at 0°, 90°, 180°, 270° or at any location in between, the article should retroreflect incident light at substantially the same intensity when a light source and a photo detector remain stationary.

The article 90 shown in FIG. 3 can be used as part of a retroreflective sheeting. U.S. Pat. No. 5,450,235 (Smith et al.

hereinafter "Smith '235") and U.S. Pat. No. 5,691,846 (Benson Jr., et al. hereinafter "Benson '846") disclose two retroreflective sheeting constructions particularly useful for the practice of Applicants' invention. Smith '235 discloses a flexible cube-corner base sheet having a body portion and a multitude of cube-corner elements that project from a rear side of the body portion. The body portion includes a cover layer that contains a light-transmissible polymeric material having an elastic modulus less than $7 \times 10^8$ pascals. The cube-corner elements contain a light-transmissible polymeric material having an elastic modulus greater than $16 \times 10^8$ pascals. An example of a useful polymer for the cube-corner elements is polycarbonate. The patent also teaches the use of a seal film attached to portions of the cube-corner elements. It is stated that the seal film maintains an air interface at the backside of the cubes to enhance retroreflectivity. Benson '846 discloses an ultra-flexible composite sheeting having a two dimensional array of cured microstructure cube-corner elements bonded to an overlay film. It is taught that the elements and the material of the overlay film form an interpenetrating network. The elements are described to have a fractured land and are substantially independent from adjacent elements thus giving the article is high flexibility.

Retroreflective sheetings of the invention may be cellular or non-cellular. In the latter case, the cube-corner optical faces typically have a reflective coating thereon, such as silver or aluminum. An adhesive layer may be applied to the reflective coated cube-corner elements for easy attachment to a substrate. The body layer or the cube-corner elements or both may contain transparent colorants to impart color to the inventive sheeting, if desired. The inventive sheeting may also comprise weather protective layers as taught in the prior art.

Figure 7:
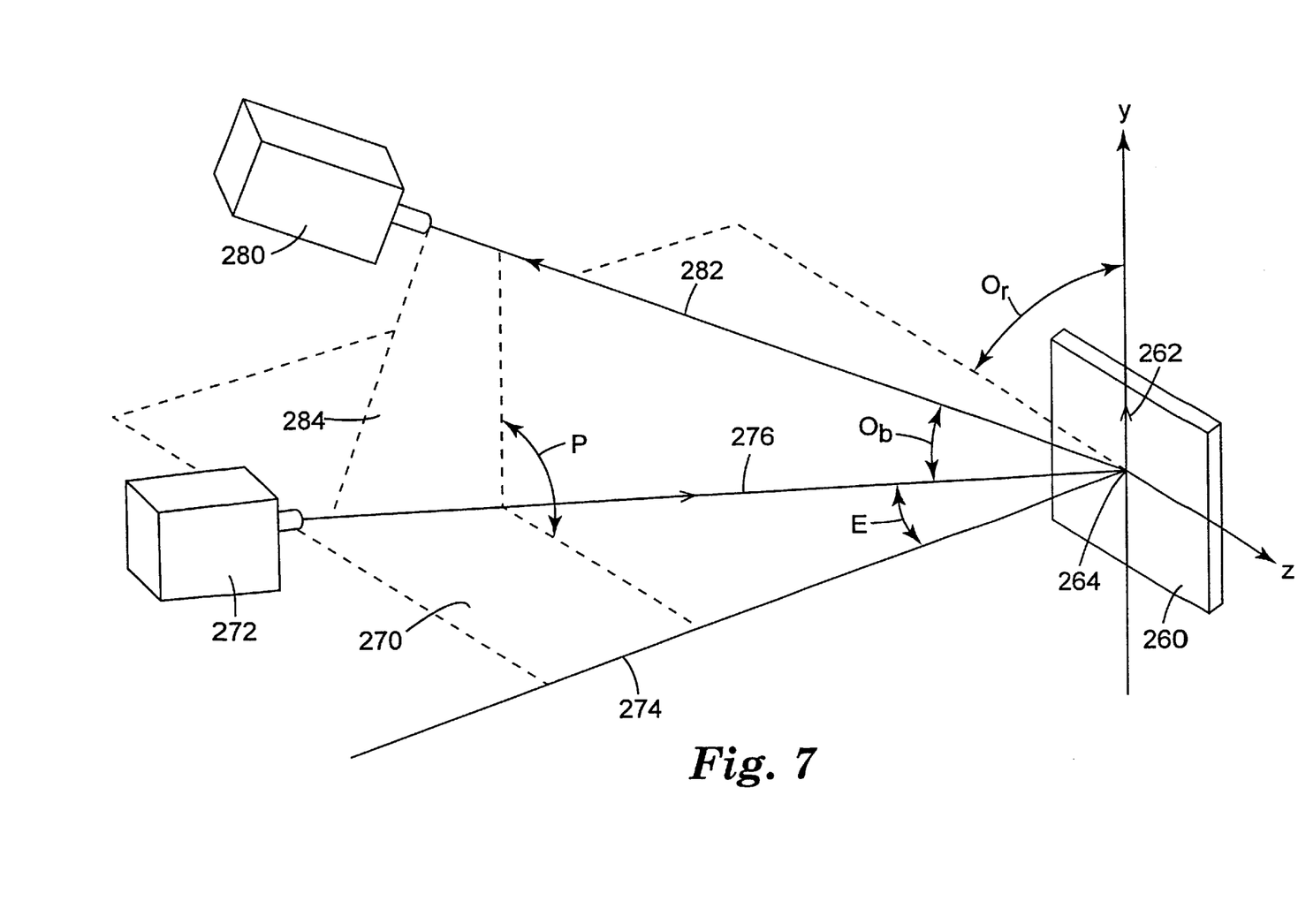
FIG. 7 is a schematic drawing of the devices, angles, and axes used to measure the parameters of reflective materials.

FIG. 7 shows the devices, angles, and axes of the United States Federal Test Method 370 and is helpful in defining the various angles referred to when measuring retroreflective brightness. A retroreflective sheeting sample 260 has a datum mark 262 and an indicia mark 264. The datum mark ensures correct alignment of a cube-corner sample, if one is used. In the case of a microsphere-based retroreflective sheeting, the sample does not need to be aligned with the datum mark. The indicia mark locates the center of the sample and is the point where incident light impinges on the sample. There are three axes, the X-axis (not shown), Y-axis, and Z-axis. The X-axis is perpendicular to the plane of the sample and coincides with reference axis 274. The Y-axis is parallel to the primary grooves of a cube-corner sample, if one is used. The Z-axis runs through the sample, and is perpendicular to the Y-axis. An entrance plane 270 includes a light source 272, a reference axis 274, the indicia mark 264, and an axis of incident light 276. The reference axis 274 is perpendicular to the plane of the sample, extending from the indicia mark 264. The axis of incident light 276 is the line along which the light travels from a light source 272 to the indicia mark 264. A photoreceptor 280 measures the retroreflected light that travels from the sample 260 along an observation axis 282. Observation angle, $O_b$, is the angle between the observation axis 282 and the axis of incident light 276. Entrance angle, E, is the angle between the axis of incident light 276 and the reference axis 274. Orientation angle, $O_r$, is the angle between the entrance plane 270 and the Y-axis. Presentation plane 284 is a plane including the observation axis 282 and the axis of incident light 276. Presentation angle, P, is the angle between the presentation plane 284 and the entrance plane 270. As the sample 260 is rotated about the Z or Y axis, the entrance angle changes. As the sample is rotated about the X-axis, the orientation angle changes.

An "isobrightness graph" of a retroreflective sheeting is a polar plot that graphs the total light return at varying entrance angles (E) and orientation angles ($O_r$) while keeping the observation angle ($O_b$) and presentation angle (P) constant. Total light return is defined as the product of percent active area and ray intensity. The latter includes interfacial and reflection losses. U.S. Pat. No. 3,812,706 (Stamm) provides excellent discussion of total light return for a specific type of cube-corner array. Generally, light from a light source impinges on a retroreflective sample. The response, in terms of a percentage of the total amount of light returned, is plotted as contour lines to show regions of constant total light reflected. The isobrightness contour lines are similar to contour lines used in elevation maps to depict constant elevation as measured from a reference point, for example, from sea level.

Figure 4:
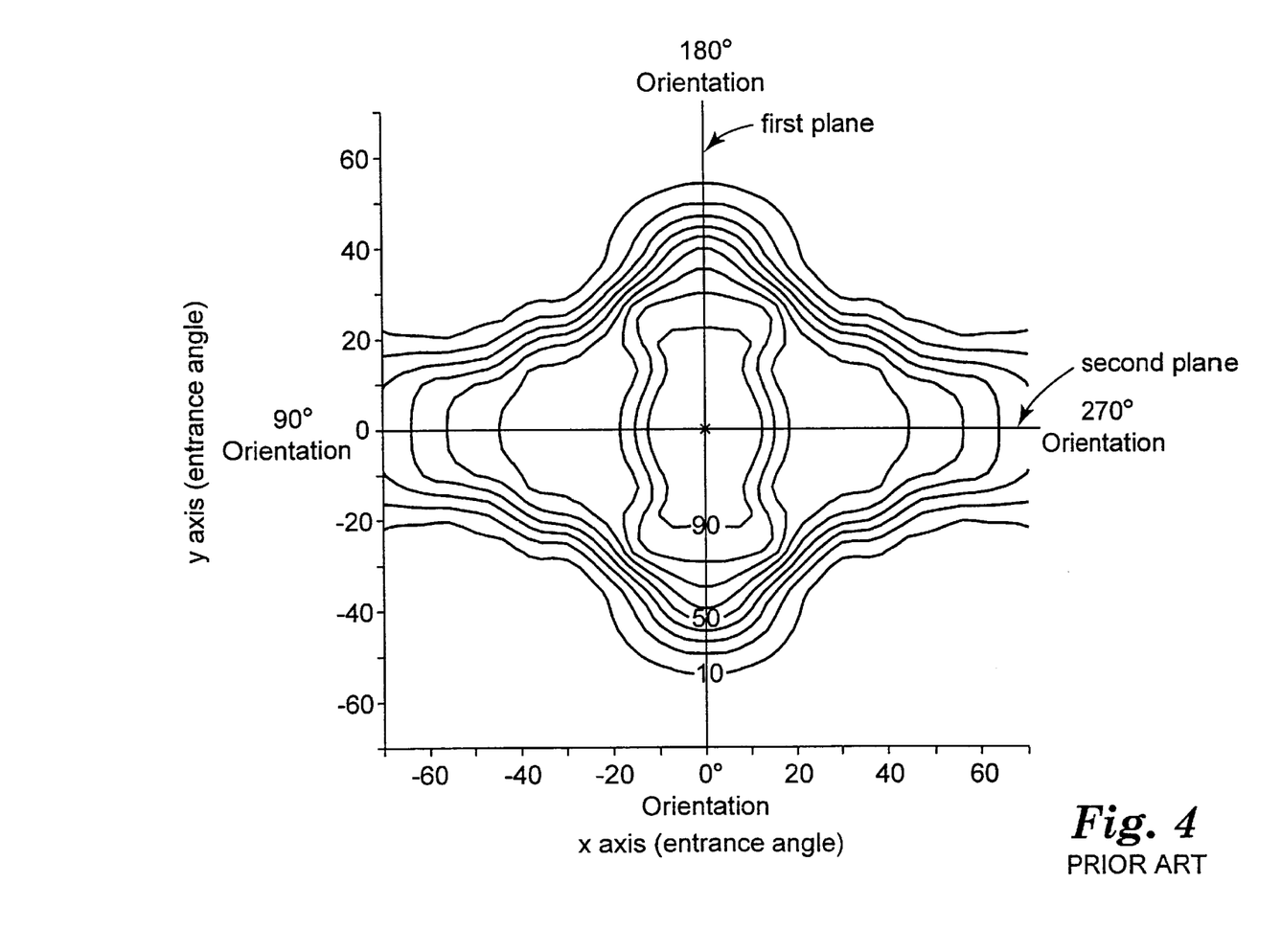
FIG. 4 is a predicted isobrightness graph of a computer-simulated model of a prior art cube-corner retroreflective article.
Figure 5:
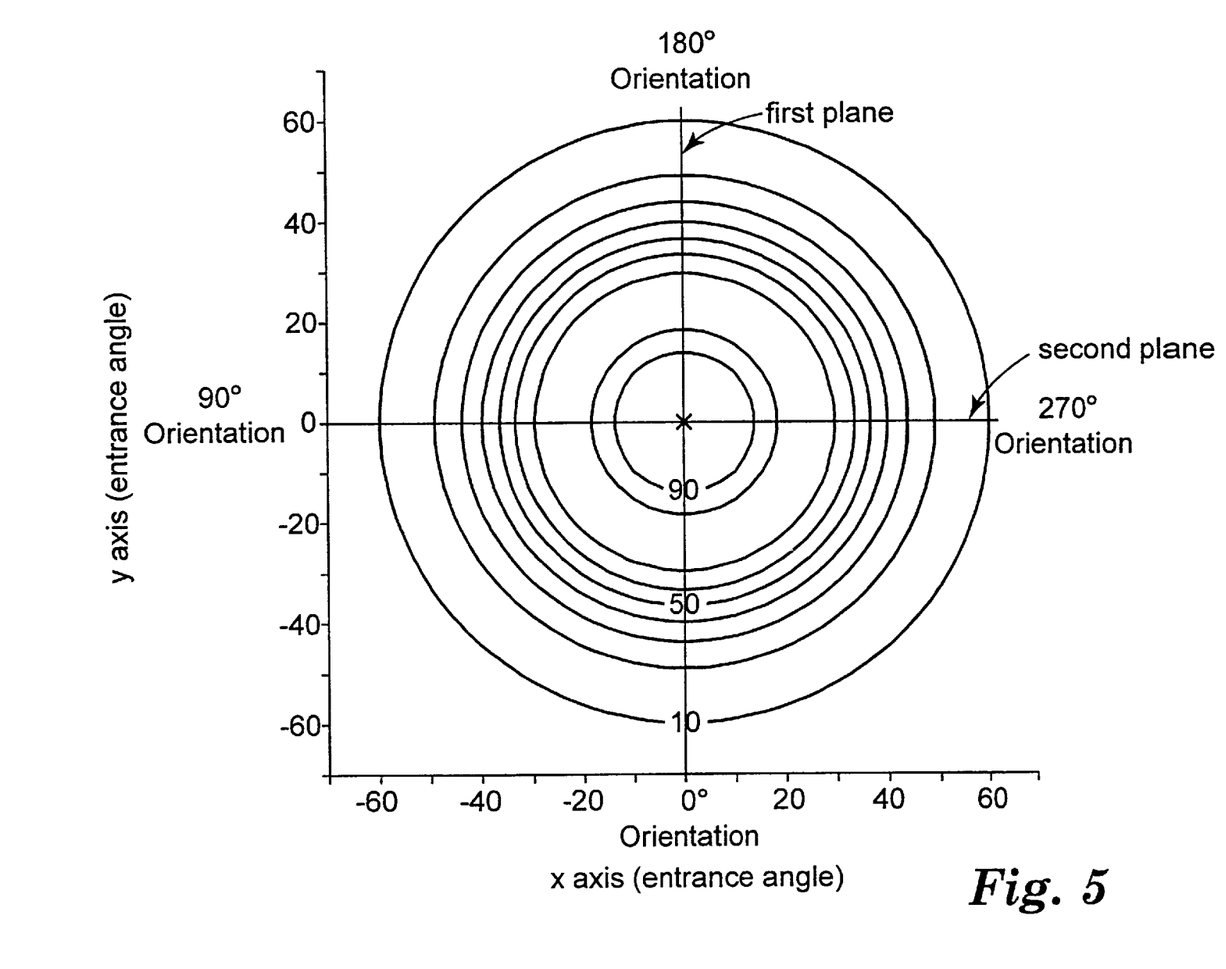
FIG. 5 is a predicted isobrightness graph of a computer-simulated model of a cube-corner sheeting based on a prior art cube-corner sheeting where the cube-corner elements have been randomized in different orientations.

FIGS. 4 and 5 show isobrightness graphs for two retroreflective articles. For ease of interpretation, the entrance angle polar axes, which would be represented as concentric circles, have been removed. Instead of polar axes, the isobrightness graphs have been changed to an x-y plot with entrance angle axes and orientation angle points. The entrance angles are depicted as the x and y axes. The entrance angle runs from negative 60° to 0° to positive 60°. Referring to FIG. 7, a negative entrance angle occurs when the axis of incident light 276 is to the left (or negative Z direction) of the reference axis 274. A 0° entrance angle occurs when the axis of incident light is superimposed on the reference axis 274. A positive entrance angle occurs when the axis of incident light is to the right (or positive Z direction) of the reference axis 274. The orientation angle is labeled as four distinct points, 0°, 90°, 180°, and 270°. The 0° orientation angle also coincides with the 360° orientation angle. Thus, in FIGS. 4 and 5, the x-axis represents the entrance angle from −60° to +60° and the 0° entrance angle coincides with the 0° orientation angle. The y-axis represents the entrance angle from −60° to +60° and the 0° entrance angle coincides with the 90° orientation angle. At the 180° orientation angle, the entrance angle axis (not shown) should also range from −60° to +60° and would look similar to the x-axis. At the 270° orientation angle, the entrance angle axis (not shown) should also range from −60° to +60° and would look similar to the y-axis. The center point of the isobrightness graphs 4 and 5 (as shown by the mark X) represents the maximum total light return normalized to its peak value of 100 percent total light return. Each isobrightness contour line radiating from the center region represents a ten-percent reduction in total light return normalized to its peak value. Three isobrightness lines (90%, 50%, and 10% of the peak brightness value) have been labeled for convenience.

FIG. 4 shows a predicted isobrightness graph of a computer simulated model of a commercially available cube-corner retroreflective sheeting known as 3M™ Scotchlite™ Diamond Grade™ LDP Sheeting Series 3970 (hereinafter "3970 Sheeting") available from Minnesota Mining and Manufacturing Company (3M) located in St. Paul, Minn. By "computer simulation," it is meant that a computer program creates a model sample of the 3970 Sheeting's cube-corner array and calculates the total light return after light has impinged on the model sample. The 3970 Sheeting contains an orderly array of about 1.59 refractive index cube-corner elements of the type described in U.S. Pat. No. 4,588,258 (Hoopman) having 55 degrees, 55 degrees, 70 degrees base triangle. The sheeting does have a primary groove. In this case, the cube-corners' primary grooves run parallel to the Y-axis shown in FIG. 7. To generate the isobrightness graph, the orientation and entrance angles are allowed to vary.

FIG. 4 shows four broad lobes of improved retroreflective performance at 90° intervals, i.e., at 0°, 90°, 180°, and 270° orientation angle. The four lobes define two primary planes of improved retroreflective performance. The first plane extends through a plane of the sheeting corresponding to the 0°–180° orientation angle. The second plane extends through another plane of the sheeting corresponding to 90°–270° orientation angle. The first plane and second planes, however, do not retroreflect incident light at the same intensity. For example, in the first plane, the 90% isobrightness contour line intersects at about the 20° entrance angle on the y-axis. In the second plane, the 90% isobrightness contour line intersects at about the 14° entrance angle on the x-axis. Stated alternatively, at a specified entrance angle of 20°, the first plane returns about 90% while the second returns only about 70% of the maximum total light return. This difference in amount of light returned is manifested as two different brightness levels.

FIG. 5 represents a predicted isobrightness graph of the sheeting of FIG. 4 where the cube-corner elements have been randomized in about eighteen different orientations. The results depicted in FIG. 5 are representative of the preferred embodiments of the invention. Because the cube-corner elements in FIG. 5 are oriented randomly, they are not packed as efficiently as the ordered cube-corner elements in FIG. 4. One skilled in the art would expect the peak total light return in FIG. 5 to be lower than that of FIG. 4. Because FIGS. 4 and 5 are normalized to show percentages of the maximum peak value, the actual peak brightness value is not given.

FIG. 5 shows the isobrightness contour lines to be nearly circular so that the sheeting's total light return performance is substantially the same in the first and second planes. For example, the 90% isobrightness line intersects the 15° entrance angle for both the first and second planes (0°–180° and 90°–270° orientation angles). Furthermore, the 90% isobrightness contour line intersects the 15 degrees entrance angle axis for any planes of the sheeting, such as those that correspond to the 30°–210°, or the 45°–225°, or the 60°–240° orientation angles (none of the planes are shown in either FIGS. 4 or 5). One skilled in the art would understand that a retroreflective sheeting having a isobrightness profile similar to that depicted in FIG. 5 would exhibit rotational symmetry. That is, the sheeting of FIG. 5 can be placed on a substrate in any orientation and it should retroreflect incident light in substantially similar intensity when the observation and presentation angles are held constant. This rotational symmetry provides opportunities for reduction of inventory and streamline the fabrication of retroreflective signs.

As a motorist approaches a stationary traffic sign, a dynamic situation is created where the observation angle, the entrance angle, and the presentation angle are changing continuously. The inventive article can accommodate the changes in geometry and give a uniform total light return to the motorist so that, at any given distance, essentially the entire sign, with all of its information, will be communicated to the motorist. Like most traffic signs however, the intensity of the total light returned at any given distance changes. For example, a motorist stationed at 1000 feet from the inventive sign detects a different intensity of the total light returned compared to a motorist stationed at 2000 feet from the inventive sign.

Methods of Manufacturing

The present invention presents novel methods of manufacturing articles having cube-corner elements that are oriented randomly. A step of the methods of the invention is to provide a plurality of discrete cube-corner elements. A method of providing discrete cube-corner elements comprises the steps of: (a) providing a cube-corner tool having first and second surfaces, the tool having a plurality of cube-corner elements projecting from the first surface; (b) applying a support layer to the tool's first surface; (c) ablating the second surface so as to create a base plane in each cube-corner element and to separate each cube-corner element; and then (d) removing the ablated cube-corner elements from the support layer to yield discrete cube-corner elements.

Figure 6A:
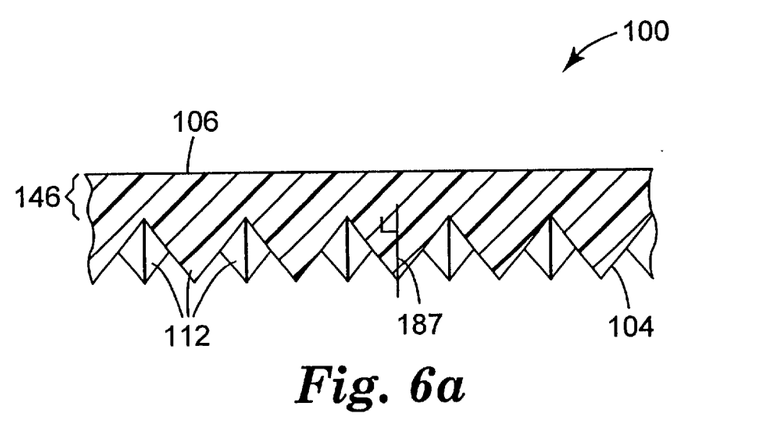
FIGS. 6a to 6c are schematic views of an illustrative method of making cube-corner article of the invention.
Figure 6B:
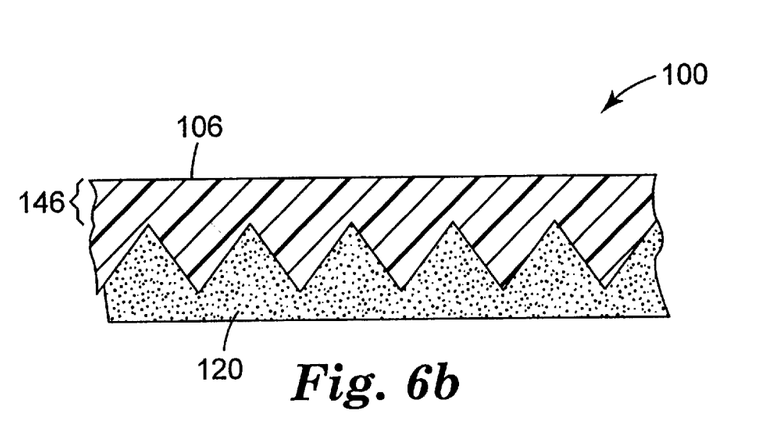
Figure 6C:
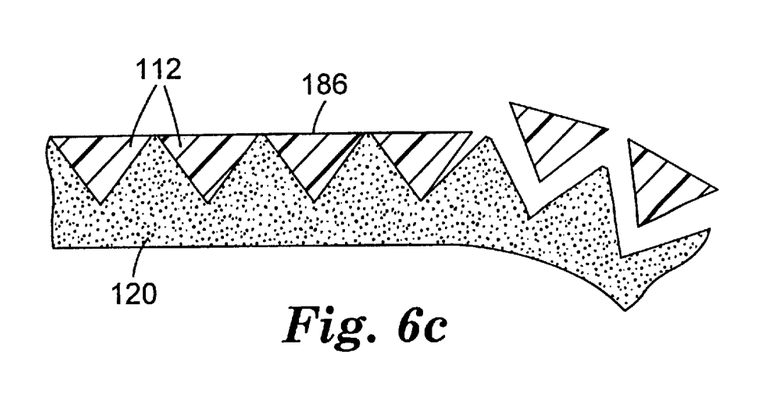

FIGS. 6a to 6c show an illustrative method for obtaining discrete elements. In FIG. 6a, a cube-corner tool 100 has a first, microstructured surface 104 defined by a plurality of cube-corner elements 112 and second substantially planar second surface 106 opposite from the first surface 104. The tool 100 typically has land layer 146 lying at the base plane of the cube-corner elements. Each cube-corner element has a central axis 187.

In FIG. 6b, support layer 120 is applied to the first surface 104 of structure 100. Materials for the support layer should be selected so that it will be sufficiently strong to hold the cube-corner elements in place for subsequent processing and yet allow the cube-corner elements to release when desired. If desired, the first surface 104 may be coated with a release agent, e.g., one selected from the group consisting of silver, aluminum, fluorocarbon, wax, and silicone. Typically the support layer is a polymeric material having an elastic modulus greater than $16 \times 10^8$ pascals. Suitable examples of polymeric materials for use as a support layer include, but are not limited to, polycarbonate and acrylic. Polymeric melts could be extruded on to the first surface of the structure and subsequently allowed to cool and harden. Alternatively, a polymeric solution can be cast and nipped against the first surface and subsequently cured to form the support layer. Conventional curing methods, such as using a ultraviolet light lamp, can be used to cure the polymeric solution thereby forming the support layer.

FIG. 6c shows the second surface 106 ablated to a point where discrete cube-corner elements 112 are formed. Each element is separated from its neighbor and each has a base plane 186. Each discrete element 112 can be removed from the support layer. Land 146 in FIG. 6b is ablated away entirely so as to create discrete elements. Further ablation of the second surface beyond the land layer cuts away at some of the cube-corner elements and the support layer. This additional ablation can be done, for example, when shorter cube-corner elements are desired (i.e., elements with shorter central axis height) or can occur inadvertently during the ablating step. So long as a portion of the cube-corner element remains after the ablating step so that it is capable of retroreflecting some incident light, the discrete cube-corner element is useful in the invention. During the ablation step, the cube-corner elements remain encased in the support layer. Suitable methods for ablating the second surface include, but are not limited to, sanding, grinding, laser cutting, machining, (such as, for example, fly-cutting) chemical etching, melting, dissolving, and vaporizing. Typically after the ablating step, the discrete cube-corner elements are removed from the support layer. During the ablating and removing steps, care should be taken to protect the optical faces of the cube-corner elements so that they will not be unduly distorted.

Once discrete cube-corner elements are available, they are disposed on a substrate, such as, e.g., a carrier web. Typically, it is desirable that the majority of the cube-corner elements have the base plane in contact with the substrate in order to maximize resultant retroreflective brightness. In another method, the discrete elements, while still encased in the support layer, are placed on a substrate and then released to minimize the number of elements whose base planes do not contact the substrate. It is possible, however, that a portion of the discrete cube-corner elements will not have the base planes in contact with the substrate, i.e., an element with one of its optical faces in contact with the substrate. Although these latter elements may be capable of retroreflecting incident light, they will not be as efficient as those elements whose base plane contact the substrate.

With the discrete elements disposed on the substrate, they are rotated about the central axis and moved away from adjacent elements while their base planes remain in contact with the substrate to yield an article having discrete cube-corner elements oriented randomly. In the case where the cube-corner elements have more than one central axis, as e.g., in the elements described in U.S. Pat. No. 4,349,598 (White) and U.S. Pat. No. 4,938,563 (Nelson et al.), rotation about only one of the central axes is needed. Suitable rotation methods can be selected from the group consisting of electrostatic, mechanical, flotation, magnetic means, and combinations thereof. For example, discrete iron-containing cube-corner elements can be rotated on a substrate using magnetic means. After the discrete cube-corner elements are randomized, they are affixed to the substrate to yield a randomized cube-corner article. If desired, the inventive tool can be replicated by conventional electroforming processes to produce replicas. The replicas, bearing cavities, can be used as molds to manufacture retroreflective sheeting or can be passed through additional replication steps to form additional tools and molds.

All references cited herein are incorporated by reference in their entirety.

What is claimed is:

1. A method of making a cube-corner article comprising the steps of:
    (a) providing a plurality of discrete cube-corner elements, each element having a base plane, a central axis, and at least three base edges, each element bounded by at least three optical faces that cooperate to retroreflect incident light;
    (b) disposing said elements to a substrate; and
    (c) affixing said elements to said substrate to yield randomly oriented cube-corner elements wherein a substantial portion of said elements' base planes are in contact with said substrate.

2. The method of claim 1, wherein some of the cube-corner elements have their optical faces affixed to said substrate.

3. The method of claim 1, wherein said affixing step is selected from a group consisting of mechanical means, magnetic means, adhesive means, and combinations thereof.

4. The method of claim 1, wherein after step (b) said method further comprises rotating a portion of said cube-corner elements about their central axis while said cube-corner base planes remain substantially in contact with said substrate.

5. The method of claim 4, wherein said rotating method is selected from the group consisting of electrostatic means, mechanical means, flotation means, magnetic means, and combinations thereof.

6. The method of claim 1 wherein said cube-corner elements differ in at least one property selected from the group consisting of cube-corner geometry, cube-corner dimension, and central axis height.

7. The method of claim 1, wherein said substantial portion of the element's base planes means more than fifty percent of the total cube-corner elements have their base planes in contact with the substrate.

8. The method of claim 1, wherein said substantial portion of the element's base planes means more than ninety percent of the total cube-corner elements have their base planes in contact with the substrate.

9. The method of claim 1, wherein said plurality of discrete cube-corner elements are made from a method comprising the steps of:
    (a) providing a cube-corner tool having first and second surfaces, said tool having a plurality of cube-corner elements projecting from said first surface;
    (b) applying a support layer to said tool's first surface;
    (c) ablating said tool's second surface so as to create a base plane in said cube-corner elements and to separate each cube-corner element; and then
    (d) removing said ablated cube-corner elements from said support layer to yield discrete cube-corner elements.

10. The method of claim 9, wherein in step (a) said cube-corner elements on said tool are coated with a release agent selected from one of the group consisting of silver, aluminum, fluorocarbon, wax, and silicone.

11. The method of claim 9, wherein said ablating step is selected from at least one method from the group consisting of sanding, grinding, laser cutting, machining, chemical etching, melting, dissolving, and vaporizing.

12. The method of claim 9, wherein said ablation step ablates beyond the point where said cube-corner elements are first separated from one another.

13. The method of claim 1, wherein the maximum length of said central axis is about 1500 micrometers.

14. A retroreflective article made according to the method of claim 1.

15. The article of claim 14 having isobrightness contour lines that are substantially circular.

16. The article of claim 14, wherein said article exhibits rotational symmetry.

* * * * *